United States Patent
Maekawa et al.

(10) Patent No.: US 11,734,721 B2
(45) Date of Patent: Aug. 22, 2023

(54) ADVERTISEMENT CONTACT DETERMINATION SYSTEM, ADVERTISEMENT CONTACT DETERMINATION DEVICE, AND PROGRAM

(71) Applicant: DENTSU INC., Tokyo (JP)

(72) Inventors: Shun Maekawa, Tokyo (JP); Kei Hamada, Tokyo (JP); Daiki Nagata, Tokyo (JP)

(73) Assignee: DENTSU INC., Tokyo (JP)

( * ) Notice: Subject to any disclaimer, the term of this patent is extended or adjusted under 35 U.S.C. 154(b) by 0 days.

(21) Appl. No.: 17/429,816

(22) PCT Filed: Feb. 14, 2020

(86) PCT No.: PCT/JP2020/005737
§ 371 (c)(1),
(2) Date: Aug. 10, 2021

(87) PCT Pub. No.: WO2020/166693
PCT Pub. Date: Aug. 20, 2020

(65) Prior Publication Data
US 2022/0129947 A1    Apr. 28, 2022

(30) Foreign Application Priority Data
Feb. 15, 2019    (JP) .................................. 2019-025497

(51) Int. Cl.
*G06Q 30/02*    (2023.01)
*G06Q 30/0251*    (2023.01)
(Continued)

(52) U.S. Cl.
CPC ..... *G06Q 30/0261* (2013.01); *G06Q 30/0246* (2013.01); *G06Q 30/0272* (2013.01); *H04W 4/023* (2013.01)

(58) Field of Classification Search
CPC .......................... G06Q 30/0261; H04W 4/023
See application file for complete search history.

(56) References Cited

U.S. PATENT DOCUMENTS 9,219,790 B1 *   12/2015   Filev .................... H04L 67/535
11,042,903 B1 *   6/2021   Crystal .............. G06Q 30/0266
(Continued)

FOREIGN PATENT DOCUMENTS

EP    3410378    12/2018
JP    2002-251572    9/2002
(Continued)

OTHER PUBLICATIONS

University of Chicago, "Multisided Platforms, Dynamic Competition, and Assessment of Market Power for Internet-Based Firms", David S. Evans at University of Chicago Law School (Year: 2016).*
(Continued)

*Primary Examiner* — Breffni Baggot
(74) *Attorney, Agent, or Firm* — Greenblum & Bernstein, P.L.C.

(57) ABSTRACT

The present disclosure optimally determines a contact between a user and an advertisement. An advertisement contact determination system according to one aspect of the present disclosure includes a communication unit configured to obtain position information of a device, and a control unit configured to determine that a user of the device has come into contact with an Out Of Home (OOH) advertisement if the OOH advertisement is included in a certain range in a traveling direction of the user based on the position information of the device. The communication unit obtains a log of a certain apparatus, and the control unit determines whether the device exists in vicinity of the certain apparatus in a certain period of time or not and, if the device exists,
(Continued)

associates the log of the certain apparatus in the certain period of time with the device.

9 Claims, 11 Drawing Sheets

(51) Int. Cl.
  *H04W 4/02* (2018.01)
  *G06Q 30/0272* (2023.01)
  *G06Q 30/0242* (2023.01)

(56) References Cited

U.S. PATENT DOCUMENTS

| | | | |
|---|---|---|---|
| 2008/0248815 A1* | 10/2008 | Busch | H04L 67/52 455/456.5 |
| 2009/0066722 A1* | 3/2009 | Kriger | G09B 17/00 345/619 |
| 2010/0070376 A1* | 3/2010 | Proud | G06Q 50/14 705/16 |
| 2013/0198003 A1 | 8/2013 | Hiyama et al. | |
| 2014/0073236 A1* | 3/2014 | Iyer | H04H 60/33 455/2.01 |
| 2014/0257969 A1* | 9/2014 | Topchy | G06Q 30/0242 705/14.42 |
| 2014/0379477 A1* | 12/2014 | Sheinfeld | G06Q 30/0251 705/14.58 |
| 2014/0379479 A1* | 12/2014 | Zeniya | G06Q 30/0261 705/14.58 |
| 2015/0095157 A1* | 4/2015 | McDevitt | G06Q 30/0261 705/14.58 |
| 2015/0106198 A1* | 4/2015 | Miller | G06Q 30/0251 705/14.52 |
| 2016/0073143 A1* | 3/2016 | Filev | H04L 67/52 725/10 |
| 2017/0200195 A1* | 7/2017 | Kugler | G06Q 30/0233 |
| 2017/0213240 A1* | 7/2017 | Waldron | G06F 16/29 |
| 2018/0247340 A1 | 8/2018 | Arai | |
| 2018/0341985 A1* | 11/2018 | Hirama | H04L 51/52 |
| 2019/0132625 A1 | 5/2019 | Matsunaga et al. | |
| 2020/0234337 A1* | 7/2020 | Fujii | G06Q 30/0266 |

FOREIGN PATENT DOCUMENTS

| | | |
|---|---|---|
| JP | 3851571 | 9/2006 |
| JP | 2016-038825 | 3/2016 |
| JP | 2017-078974 | 4/2017 |
| JP | 2018-206364 | 12/2018 |
| WO | 2012/043291 | 4/2012 |
| WO | 2017/047063 | 3/2017 |
| WO | 2017/183703 | 10/2017 |

OTHER PUBLICATIONS

Office Action issued in Japan Counterpart Patent Appl. No. 2019-025497, dated Dec. 5, 2019, along with an English translation thereof.

Office Action issued in Japan Counterpart Patent Appl. No. 2019-025497, dated Jul. 8, 2019, along with an English translation thereof.

Official Communication issued in International Bureau of Wipo Patent Application No. PCT/JP2020/005737, dated May 12, 2020, along with an English translation thereof.

Extended European Search Report (EESR) from European Patent Office (EPO) in European Patent Appl. No. 20754893.4, dated Sep. 30, 2022.

* cited by examiner

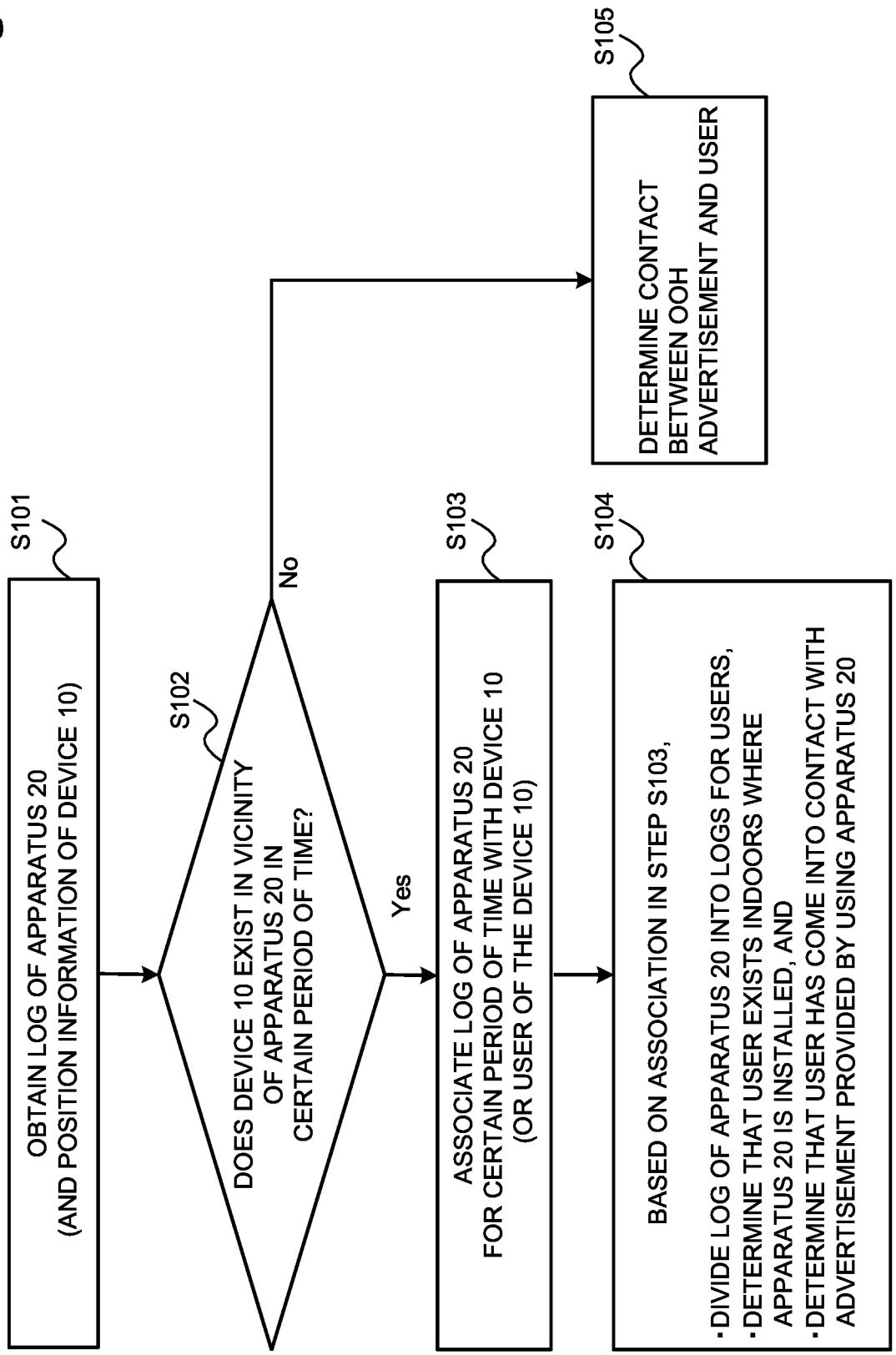

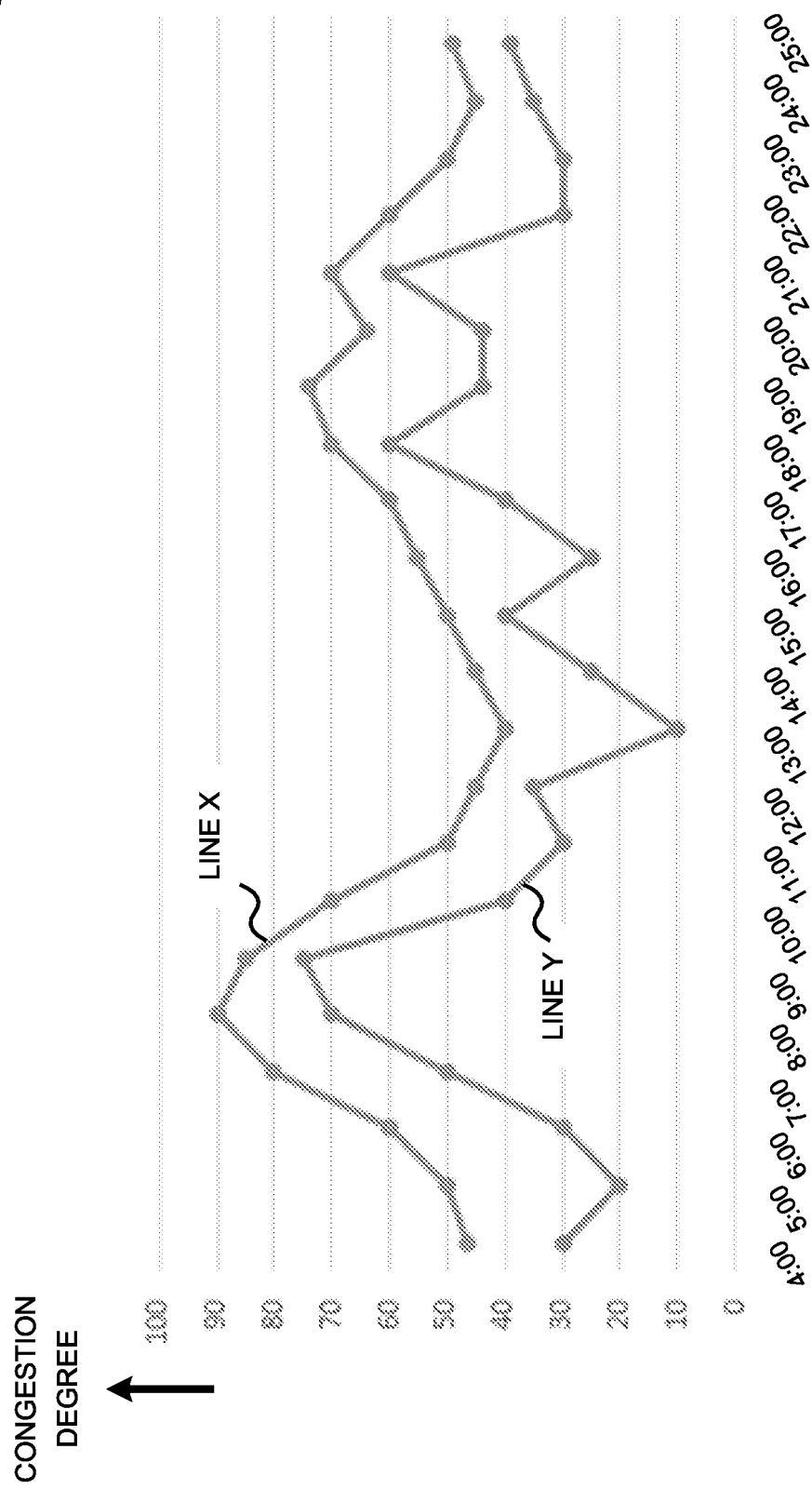

Fig.8A

WHEN AISLE IS NOT CROWDED

| | WINDOW ADVERTISEMENT | DOOR ADVERTISEMENT | HANGING ADVERTISEMENT |
|---|---|---|---|
| A | 1 | 0 | 1 |
| B | 1 | 0 | 1 |
| C | 1 | 1 | 1 |
| D | 1 | 0 | 1 |
| E | 1 | 1 | 1 |
| F | 0 | 1 | 1 |
| G | 0 | 1 | 1 |

Fig.8B

WHEN CAR IS CROWDED

| | WINDOW ADVERTISEMENT | DOOR ADVERTISEMENT | HANGING ADVERTISEMENT |
|---|---|---|---|
| A | 1 | 0 | 1 |
| B | 1 | 0 | 1 |
| C | 1 | 0 | 1 |
| D | 0 | 0 | 1 |
| E | 0 | 0 | 1 |
| F | 0 | 0 | 1 |
| G | 0 | 0 | 1 |

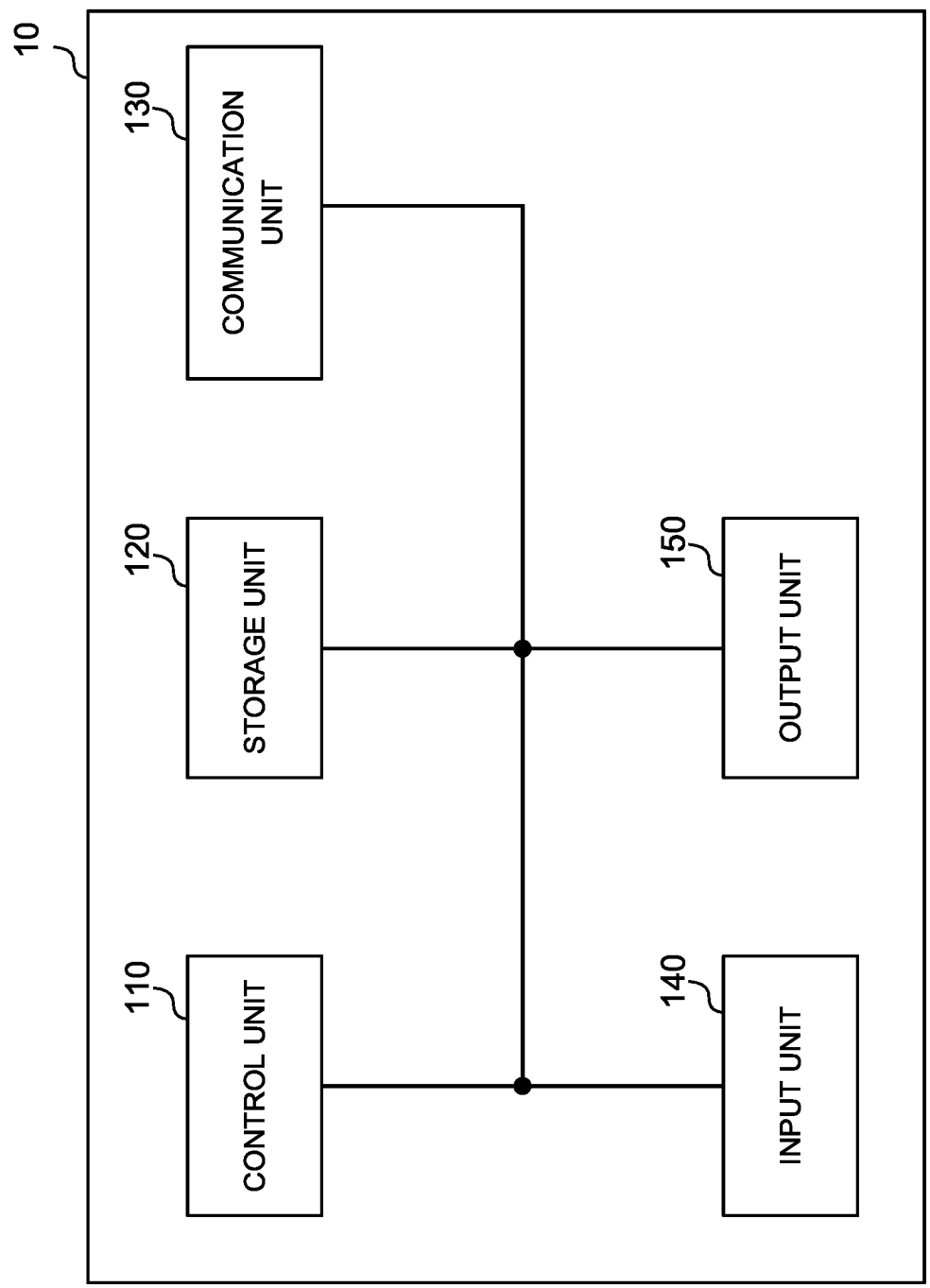

ADVERTISEMENT CONTACT DETERMINATION SYSTEM, ADVERTISEMENT CONTACT DETERMINATION DEVICE, AND PROGRAM

TECHNICAL FIELD

The present disclosure relates to an advertisement contact determination system, an advertisement contact determination device and a program.

BACKGROUND ART

In recent years, comprehensive management of television advertisements and Internet advertisements has been closely studied. With such configurations, effective attainment of the target number of times (which may be called "frequency") that users come into contact with an advertisement and the target number and/or proportion (which may be called "reach") of users having come into contact with the advertisement can be expected.

As one method, a technology has been proposed which executes a questionnaire survey on viewing states of a television advertisement through terminals of viewers and evaluates a distribution effect of the advertisement based on responses to the questionnaire survey and viewing history of a web advertisement (Patent Literature 1).

An advertisement through a medium to be in contact in a location other than home is called an "Out Of Home (OOH) advertisement" or "OOH medium". Examples of the OOH advertisement include a traffic advertisement and an outdoor advertisement.

The traffic advertisement is a medium with which a consumer comes into contact when the consumer is on the move or is away from home, and the traffic advertisements on a commuting route or a school route of consumers particularly exhibit a high advertisement effect because it is repeatedly viewed. Examples of the traffic advertisement include a hanging advertisement and advertisements above a window, on a side of a door, above a door and on a strap within a moving object (such as a train, a bus, and a taxi), an advertisement on an in-train vision, an advertisement in station premises, and a car body advertisement. Examples of the outdoor advertisement include an advertising signage, a poster, a sticker and mobile advertising (such as an advertising truck, an advertising balloon, and an advertising airship). Also, as the OOH advertisement, digital signage advertising using a display installed on a wall surface has been increasingly used.

CITATION LIST

Patent Literature

Patent Literature 1: Japanese Patent Laid-Open No. 2017-78974

SUMMARY OF INVENTION

Technical Problem

As described above, there are opportunities to be exposed to a variety of advertisements indoors and outdoors. However, a problem has arisen that it is difficult to identify where and what kind of advertisement each user is exposed to. Without solving this problem, a targeted advertisement to an individual user cannot be optimally distributed, and there is a risk that the advertising effect is reduced.

Accordingly, it is one of objects of the present disclosure to provide an advertisement contact determination system, an advertisement contact determination device and a program by which a contact between a user and an advertisement can be optimally determined.

Solution to Problem

An advertisement contact determination system according to one aspect of the present disclosure includes a communication unit configured to obtain position information of a device, and a control unit configured to determine that a user of the device has come into contact with an Out Of Home (OOH) advertisement if the OOH advertisement is included in a certain range in a traveling direction of the user based on the position information of the device. The communication unit obtains a log of a certain apparatus, and the control unit determines whether the device exists in vicinity of the certain apparatus in a certain period of time or not and, if the device exists, associates the log of the certain apparatus in the certain period of time with the device.

Advantageous Effect of Invention

According to one aspect of the present disclosure, a contact between a user and an advertisement can be optimally determined.

BRIEF DESCRIPTION OF DRAWINGS

FIG. 2 is a diagram showing an example of a flowchart of an advertisement contact determination method according to one embodiment.

FIG. 6 is a diagram showing an example of congestion states by time zone of lines.

FIGS. 8A and 8B are diagrams showing examples of visually recognizable advertisements depending on user positions within a car.

FIGS. 9A to 9C are diagrams showing an example of determination of an advertisement with which a user has come into contact within a car based on the time zone when the user has ridden (or been) on a car and the position of the user within the car.

FIG. 10 is a diagram showing an example of a functional configuration of a device according to one embodiment.

DESCRIPTION OF EMBODIMENTS

Figure 1:
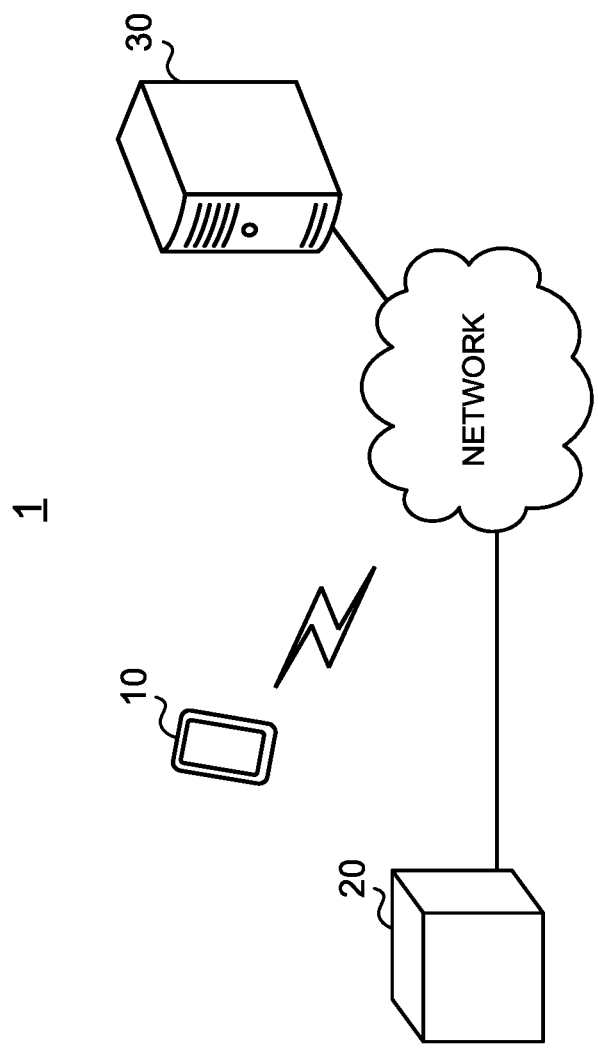
FIG. 1 is a diagram showing an example of a schematic configuration of an advertisement contact determination system according to one embodiment.

Embodiments of the present disclosure will be described below in detail with reference to accompanying drawings. In the description below, the same units are given the same reference numerals. Since the same units have the same name, the same function and so on, detailed description will not be repeated.

(Advertisement Contact Determination System)

FIG. 1 is a diagram showing an example of a schematic configuration of an advertisement contact determination system according to one embodiment. An advertisement contact determination system 1 shown in FIG. 1 includes a device 10, an apparatus 20 and an advertisement contact determination device 30.

The device 10 is a device carried by a user (consumer) and is, for example, a mobile communication terminal. The device 10 may be a cellular phone, a smartphone, a tablet terminal, a personal computer or the like. In other words, the device 10 according to the present disclosure can be replaced by a communication device.

The device 10 may execute an application such as a browser in response to an operation by a user. The device 10 may receive an Internet advertisement, Internet radio and so on.

The apparatus 20 is an apparatus that acquires, records or collects a log corresponding to the apparatus 20 and transmits it to the determination device 30. The apparatus 20 may be a television (TV), a moving object (such as an automobile or a drone), a home appliance, a robot or the like. In other words, the apparatus 20 may be a moving object, may be mounted in a moving object or may not move (for example, may be installed in a house of a user of the device 10). The apparatus 20 is usable by a plurality of people (such as members within a household of a user of the device 10).

The log corresponding to the apparatus 20 may be a television viewing log, a vehicle driving log, a usage history of a home appliance (such as a door opening/closing history of a refrigerator or a history of a timer of a microwave oven). The log corresponding to the apparatus 20 may include a timestamp (time information) corresponding to a time when an event occurs, an Internet protocol (IP) address corresponding to the apparatus 20 and the like. Hereinafter, the log corresponding to the apparatus 20 is also simply called a "log of the apparatus 20".

Here, the television viewing log may also be called "broadcasting viewing log", "viewing history", "panel data" or the like. The television viewing log may include information on a viewed television program and information on a viewed commercial message (CM) and so on.

Televisions (television receivers) may be apparatuses having a function of receiving at least one of terrestrial broadcast, broadcasting by Broadcasting Satellite (BS)/ Communications Satellite (CS), Internet broadcasting (Internet television) and the like. For example, the televisions may be multi-function televisions, smart TVs, IP TVs, set top boxes or the like.

Note that broadcasting means transmission of telecommunication intended to be directly received by the public and may include radio broadcasting and Internet broadcasting.

The advertisement contact determination device 30 is a device that performs processing relating to determination of an advertisement contact state of a user of the device 10. Hereinafter, the advertisement contact determination device 30 is also simply called "determination device 30".

The determination device 30 may receive, manage, collect, and analyze position information of the device 10 and a log of the apparatus 20. The determination device 30 may directly receive them from the device 10 or the apparatus 20 or may receive them via another device.

The determination device 30 may determine when, where and how a user of the device 10 has come into contact with an Internet advertisement (which may also be called "web advertisement", "digital advertisement" or the like) provided through the device 10, an advertisement (such as a television advertisement) provided through the apparatus 20, an OOH advertisement or other advertisements.

The advertisement may be composed of, for example, text, an image (still image or moving image), voice or other media or a combination thereof. The advertisement may be distributed by using a data management platform (DMP), a demand side platform (DSP), other ad servers or the like.

The ad server may be a distribution server using an application programming interface (API) (Ads-API) provided by a specific company (such as Twitter (registered trademark), Inc. or Facebook (registered trademark), Inc.). The ad server may be a video advertisement distribution server that distributes an online video advertisement or a content management system (CMS) that distributes an advertisement to television receivers.

The device 10, the apparatus 20, the determination device 30 and so on may communicate with a network (such as the Internet) through at least one of a wired line and a wireless line (such as a long term evolution (LTE) or Wi-Fi (registered trademark)). The device 10 and the apparatus 20 may be connected to an external network via a router or may be directly connected to an external network.

The device 10 may transmit position information of the device 10 to the determination device 30. The position information may include a timestamp (time information) corresponding to a time when the position information is obtained, an IP address corresponding to the device 10 and the like. The apparatus 20 may transmit a log of the apparatus 20 to the determination device 30.

Examples of functional configurations and hardware configurations of the devices and apparatuses such as the device 10 will be described below.

Note that the above system configuration is a mere example and the system configuration is not limited to the above system configuration. For example, for each kind of apparatus or device, only one is included in FIG. 1, but the number for each kind of apparatus or device is not limited to one, and more than one may exist. The advertisement contact determination system 1 may be configured such that a part of the apparatuses and devices are not included or may be configured such that a function of one apparatus or device is realized by a plurality of apparatuses or devices. A configuration is also possible in which functions of a plurality of apparatuses or devices are realized by one apparatus or device.

(Advertisement Contact Determination Method)

An advertisement contact determination method according to one embodiment of the present disclosure will be described below. The advertisement contact determination method may be applied to the aforementioned advertisement contact determination system.

FIG. 2 is a diagram showing an example of a flowchart of an advertisement contact determination method according to one embodiment.

The determination device 30 obtains a log of the apparatus 20 (step S101). Note that the determination device 30 may obtain position information of the device 10. Note that, although a pair of the device 10 and the apparatus 20 owned by one user is described in this example, the present disclosure is not limited thereto. The determination device 30 may receive position information of many different devices 10 and logs of many different devices 20, and the steps in FIG. 2 may be attempted for an arbitrary combination of those devices 10 and the apparatuses 20.

The determination device 30 determines whether or not the device 10 exists in vicinity of the apparatus 20 in a certain period of time (step S102).

The fact that the device 10 exists in vicinity of the apparatus 20 may be decided from the position information of the device 10, the log of the apparatus 20 or the like obtained in step S101 (note that the term "decide" may be interchanged with "determine", "identify" or the like in the present disclosure). For example, the fact that the device 10 exists in vicinity of the apparatus 20 may be decided based on at least one of following conditions.

(1) The device 10 and the apparatus 20 are connected to each other.
(2) The distance between the device 10 and the apparatus 20 is equal to or shorter than a certain distance.
(3) The device 10 and the apparatus 20 have the same IP address.

In other words, the expression "certain period of time" above may refer to a period in which at least one of the conditions (1) to (3) is satisfied. The certain period of time in step S102 may be limited to a time when the apparatus 20 is operating or may include a time when the apparatus 20 is not operating. The term "vicinity" in the present disclosure may refer to a certain or shorter distance (such as one meter, two meters or 10 meters) or refer to satisfaction of at least one of the conditions (1) to (3).

The connection in the condition (1) may include wired connection and may include wireless connection using a specific communication method. The specific communication method is preferably a method using pairing and may be, for example, Bluetooth (registered trademark). In the condition (1), at least one of the device 10 and the apparatus 20 may transmit, to the determination device 30, information on a device to which it is connected (or is connecting), information indicating that the connection has been established by using a specific method or the like.

For example, in a case where the device 10 and the apparatus 20 are connected by using a method such as SmartDeviceLink (registered trademark), the device 10 may estimate that the apparatus 20 is a vehicle, and information indicating that connection with the apparatus 20 being a vehicle has been established may be transmitted to the determination device 30.

The distance in the condition (2) above may be derived based on positions of the device 10 and the apparatus 20. The positions of the device 10 and the apparatus 20 may be identified from the position information. The position information in the present disclosure, for example, may include at least one of a latitude and a longitude or may include information on at least one of check-in and check-out to a certain building (or place).

The position information in the present disclosure may include information acquired by using a positioning system such as a global positioning system (GPS). The position information in the present disclosure may include information on a base station (or an access point) to which the device 10 or the apparatus 20 is connected, an IP address of the device 10 or the apparatus 20 or the like.

The position information in the present disclosure may be acquired based on information (such as images) acquired by the device 10, the apparatus 20, and a sensor, a camera or the like positioned indoors/outdoors. For example, in a case where the device 10 is shown in an image of a camera in a certain station, which is obtained by the determination device 30, the determination device 30 may decide that the device 10 has been positioned in the station at a time when the image is captured. The sensor, camera or the like positioned indoors/outdoors may be installed in a fixed manner or may be mounted on a moving object such as a drone or a vehicle.

At least one of the device 10 and the apparatus 20 may transmit position information of itself, and at least one of position information of the other one and a distance to the other one to the determination device 30.

The position of at least one of the device 10 and the apparatus 20 may be registered in advance with the determination device 30. For example, in a case where a certain address for the apparatus 20 is registered in advance, the determination device 30 may assume that the position of the apparatus 20 is at the certain address.

Regarding the condition (3), for example, in a case where the device 10 and the apparatus 20 are connected to the same router, the IP addresses of the device 10 and the apparatus 20 viewed from outside (that is, from the determination device 30) are normally the same. Therefore, the device 10 and the apparatus 20 having the same IP address may be assumed to be at close positions.

At least one of the device 10 and the apparatus 20 may transmit, to the determination device 30, at least one of its own IP address and an IP address of the other one.

If it is determined that the device 10 exists in vicinity of the apparatus 20 in the certain period of time (Yes in step S102), the determination device 30 may associate a log of the apparatus 20 for the certain period of time with the device 10 (a user of the device 10 by extension) (step S103).

The log while the apparatus 20 is operating and the user of the device 10 may be associated by using an ID relating to the device 10. Hereinafter, the ID relating to the device 10 is also called a "mobile ID".

The mobile ID may include at least one kind of information by which the device 10 is identified, such as an IP address of the device 10, a media access control (MAC) address of the device 10, information relating to an advertisement ID distributed to the device 10, a web access log of the device 10, a SIM card unique number (which may be a telephone number) of the device 10 and a unique ID number of the user (which, for example, may be given when the user signs a contract with a communication carrier) and may be called, for example, an advertisement identifier (ID) specific information.

Here, the advertisement ID may be an anonymous and unique identifier for advertisement distribution (identifier relating to an advertisement) that the user can opt out. For example, the advertisement ID may be an identifier obtained from an application installed in the device 10 and may include at least one of, for example, Android Advertising ID (AAID), Identification For Advertisers (IDFA), Cookie and the like.

Note that Cookie may have different IDs between browsers. The advertisement ID may also be called, for example, "Cookie information". In the present disclosure, Cookie and Cookie ID may be interchangeable with each other.

The determination device 30 may store a log of the apparatus 20 and information (correspondence relationship) with which the mobile ID of the device 10 in vicinity of the apparatus 20 is associated. Note that, in addition to or instead of the mobile ID, an ID relating to the user (user ID) can be associated. The user ID may be, for example, an e-mail address of the user, an ID of a certain account or the like.

In addition to or instead of a log of the apparatus 20, an ID relating to the apparatus 20 may be associated. The ID relating to the apparatus 20 may include at least one kind of information by which the apparatus 20 can be identified such as an IP address of the apparatus 20, a MAC address, an ID of an account associated with the apparatus 20, a serial number of the apparatus 20 and a medium (such as a card) required for an operation of the apparatus 20.

Note that the number of devices 10 determined as existing in vicinity of the apparatus 20 at a certain time may be limited to a certain threshold value or lower. If there are a plurality of devices 10 satisfying at least one of the conditions (1) to (3) above, the device 10 selected from the devices 10 satisfying the condition may be decided as the device 10 existing in vicinity of the apparatus 20. The selection of the device 10 may be decided in order of the number of satisfied conditions of the conditions (1) to (3) above or may be decided in increasing order of the distance between the device 10 and the apparatus 20.

For example, a case will be considered in which there are three users carrying the devices 10 in a house where the apparatus 20 is installed and the IP addresses of those three devices 10 (which are called "device 10-1", "device 10-2" and "device 10-3") and the apparatus 20 are the same. In this case, if, for example, only the device 10-1 is connected to the apparatus 20, the determination device 30 may decide that the device 10-1 exists in vicinity of the apparatus 20, and a log of the apparatus 20 may be associated with the device 10-1.

Also in the same case, in this case, if, for example, the distance between the apparatus 20 and the device 10-3 is the shortest, the determination device 30 may decide that the device 10-3 exists in vicinity of the apparatus 20, and a log of the apparatus 20 may be associated with the device 10-3.

The determination device 30 may divide a log of the apparatus 20 into logs for users (which may be called "personal log", "individual log" or the like) based on the association in step S103 (step S104). This is because the user using the apparatus 20 at a certain time can be decided as being the same as the user of the device 10 in vicinity according to step S103.

Note that, if the device 10 exists in vicinity of the apparatus 20 in the certain period of time (Yes in step S102), the determination device 30 may decide that the device 10 (by extension, the user of the device 10 or the user corresponding to the mobile ID of the device 10) exists indoors (such as within the house) where the apparatus 20 is installed (or stays at home).

If it is decided that the device 10 exists in vicinity of the apparatus 20 in the certain period of time (Yes in step S102), the determination device 30 may determine that the user of the device 10 in vicinity of the apparatus 20 has come into contact with an advertisement provided by using the apparatus 20 in the certain period of time.

Note that, if there are a plurality of different apparatuses 20 (such as a television and a microwave oven) within the house and if the device 10 can be associated with at least one of the apparatuses 20, the determination device 30 may also apply the association between the device 10 and the other apparatuses 20.

According to the embodiment described above, for example, division of a log of the apparatus 20 and the determination of whether the users are staying at home or not can be performed optimally based on mobile IDs.

<Conjunction with Certain Data>

The division of a log in step S104 above may be performed in consideration of other information in addition to the association in step S103. The other information preferably corresponds to panel data (such as representative panel data of respondents to a certain survey) and, for example, may include an audience rating managed by a television audience rating researcher.

The audience rating may be calculated from data of a viewing history acquired by a certain measurement device connected to the apparatus 20 (such as a television) in a certain household (such as a survey participating household). The audience rating may include a least one of a household audience rating and an audience rating (individual audience rating) of a certain target (a user corresponding to a certain attribute).

Here, although the attribute (individual attribute) is assumed as a division based on gender or age used in the field of marketing (M1-M3 layers, F1-F3 layers, C layer, T layer), the attribute is not limited thereto.

If it is determined in the step in FIG. 2 that users are staying at home and it is derived, based on the data of the viewing history above, that there is a high probability that a user having a specific attribute (such as M1) is watching the apparatus 20 (television) within the house, the determination device 30 may determine that the user having the specific attribute is almost certainly watching the television.

If it is determined in the step in FIG. 2 that the users are staying at home and if it is derived, based on data on the viewing history above, that there is a low probability that a user in the house (or a user having a specific attribute) is watching the apparatus 20 (television) within the house, the determination device 30 may determine that the user (or the user having the specific attribute) is just staying at home and is not watching the television.

If it is determined in the step in FIG. 2 that a user is not at home, the determination device 30 may determine that the user is not watching the television irrespective of the result of PM.

According to the aforementioned embodiment, a usage state of the apparatus 20 and the determination on whether a user is staying at home or not can be determined with higher precision based on certain data.

<OOH Advertisement Contact Determination when User is not at Home>

During a period while the device 10 does not exist (or cannot be detected) in vicinity of the apparatus 20 (No in step S102), the determination device 30 may decide that the user of the device 10 is not at home. The determination device 30 may determine a contact (such as viewing or recognition) between an OOH advertisement and the user during the period (which may also be called "out-of-home period", "outing period" or the like) (step S105). For example, the determination device 30 may determine what kind of OOH advertisement, where and how many times the user has come into contact with during the out-of-home period.

Note that the expression "the user of the device 10 is not at home" can be interchanged with the expression "the user of the device 10 (or the device 10) does not exist in vicinity of the apparatus 20".

The determination device 30 may decide that the user has come into contact with an advertisement (such as a signage) at a certain location if position information of the device 10 is in vicinity of the certain location. The determination device 30 may decide that the device 10 exists in vicinity of a certain location if the position information of the device 10 indicates a certain range including the certain location.

The certain range may be called an advertisement contact area, an advertisement viewing area or the like. The shape of the advertisement contact area may be an arbitrary shape such as a circle, a square or a triangle when viewed from the above. The shape of the advertisement contact area may be identified based on a coordinate of a vertex (such as a latitude or a longitude). The determination device 30 may receive information on the advertisement contact area, or the information may be set for the determination device 30.

A wide variety of advertisement contact areas may be set for the determination device 30. FIGS. 3A and 3B and FIGS. 4A and 4B are diagrams showing examples of the advertisement contact area. These figures are viewed from the above.

Figure 3B:
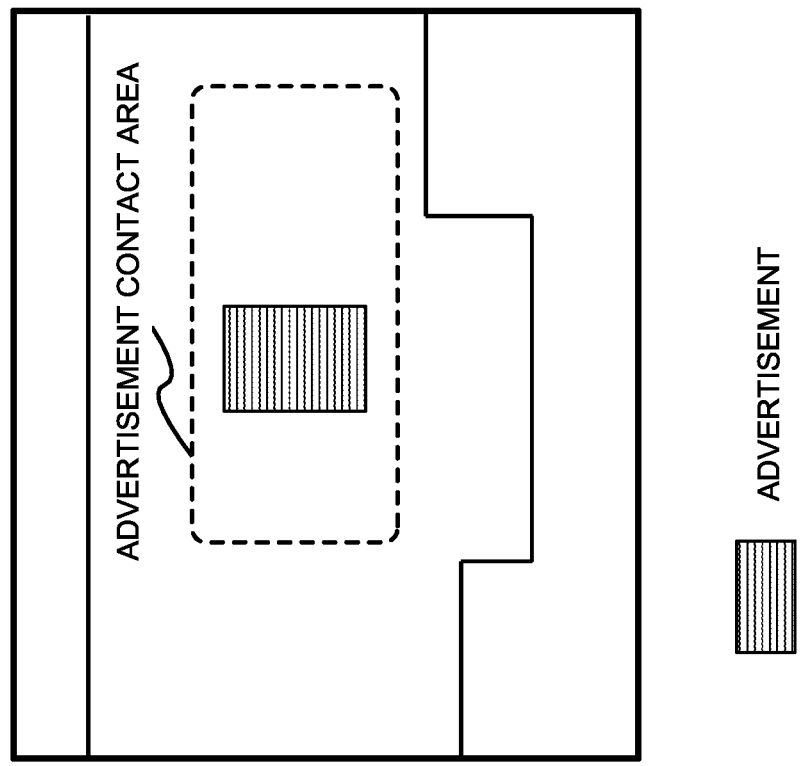
FIGS. 3A and 3B are diagrams showing examples of an advertisement contact area.
Figure 3A:
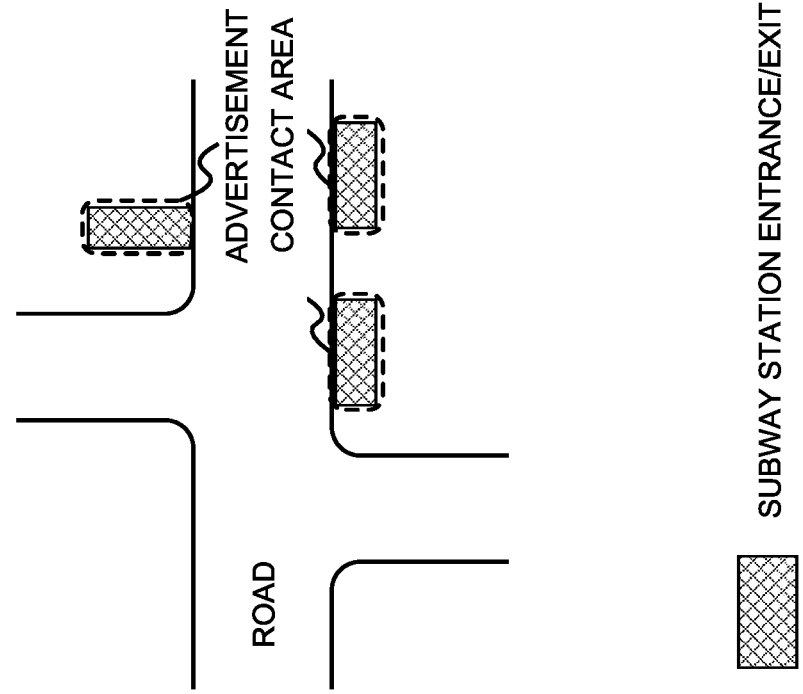

FIG. 3A shows a case where an advertisement contact area is set around an advertisement (such as a signage) in a station on the ground. The determination device 30 may determine that a user having entered the advertisement contact area as shown in FIG. 3A has come into contact with the advertisement.

FIG. 3B shows a case where advertisement contact areas are set around an entrance/exit on the ground of a subway station. The determination device 30 may determine that a user having entered the advertisement contact area as shown in FIG. 3B has come into contact with an advertisement (such as a signage) installed in the subway station.

Figure 4B:
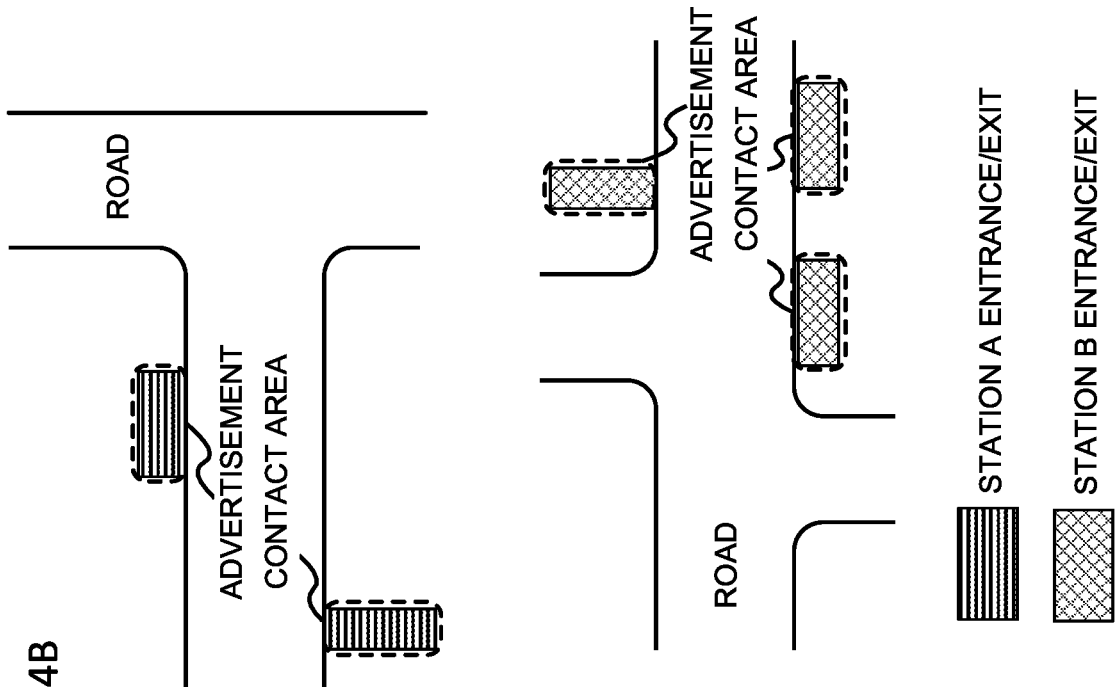
FIGS. 4A and 4B are diagrams showing other examples of an advertisement contact area.
Figure 4A:
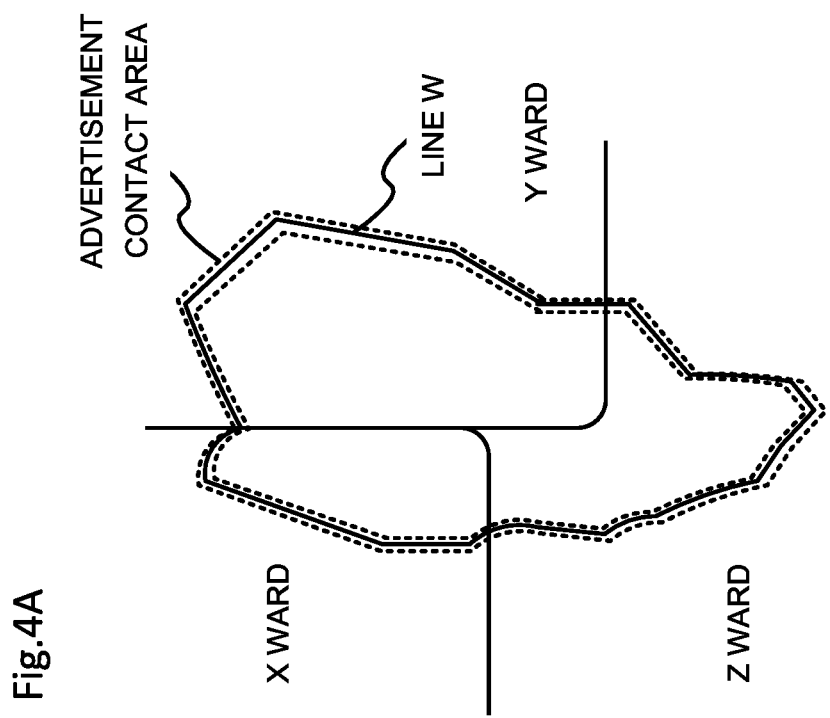

FIG. 4A shows a case where an advertisement contact area is set along a line (Line W) straddling three wards (X ward, Y ward and Z ward). The advertisement contact areas in FIG. 4 may be set only on a track excluding a station or may be set so as to include a station and a track. The determination device 30 may determine that a user having entered the advertisement contact area on a moving path of the moving object as shown in FIG. 4A has come into contact with an advertisement (such as a signage) installed in a moving object.

Although an example where the moving object is a train (car) is described below according to an embodiment of the present disclosure, the moving object is not limited thereto, but the moving object may be a bus, a taxi, a ship, an airplane or the like. In other words, the car of the present disclosure is interchangeable with other mobile bodies.

FIG. 4B shows a case where advertisement contact areas are set around an entrance/exit on the ground of two subway stations (a station A and a station B). If a user having entered the advertisement contact area in one of the stations as shown in FIG. 4B has left the advertisement contact area in the other station within a certain period of time (such as one day), the determination device 30 may determine that the user has come into contact with an advertisement installed in those subway stations and an advertisement within the subway connecting those two stations.

Note that whether a certain user has come into contact with an advertisement or not may be decided based on the number of times the user has entered a corresponding advertisement contact area within a certain period of time. For example, the determination device 30 may determine that a user having entered, even once, some part of an advertisement contact area corresponding to a certain line has come into contact with an advertisement provided within a car of the line. The determination device 30 may determine that a user having entered two points or more of an advertisement contact area corresponding to a certain line has come into contact with an advertisement provided within a car of the line. The determination device 30 may determine that a user having entered an advertisement contact area corresponding to a certain line 10 times or more in one week has come into contact with an advertisement provided within a car of the line.

The advertisement contact determination within a car will be described below in more detail.

The determination device 30 may determine a user who satisfies a specific condition (such as having entered an advertisement contact area corresponding to a certain line twice or more per day and four or more days in one week) as using the line for commuting to and from an office or a school. The determination device 30 may determine a user who uses the line for commuting to and from an office or a school as having come into contact with an advertisement provided within a car of the line and may assume a different advertisement effect compared with other users (users using the line for reasons other than commuting to and from an office or a school).

The determination device 30 may determine a user regularly included in an advertisement contact area at an entrance/exit of some stations of a certain line as a periodical user of the line or as living near the line and may determine that the user has come into contact with an advertisement provided within a car of the line. Also, the determination device 30 may determine a user who is included in an advertisement contact area of a certain station a plurality of number of times per week and has not entered an advertisement contact area within a specific line as a user of another line (such as another line that is different from the specific line but passes the station).

Note that, in the present disclosure, instead of or in addition to the position information, other information (such as a log of a transit system (arbitrary moving object) used by a user or captured images thereof by using a drone) may be used for the determination of an advertisement contact area.

Instead of or in addition to the position information of the device 10, the determination device 30 may determine a contact with an OOH advertisement by a user of the device 10 in consideration of at least one of a moving path of the device 10 and a direction of the user of the device 10.

Figure 5B:
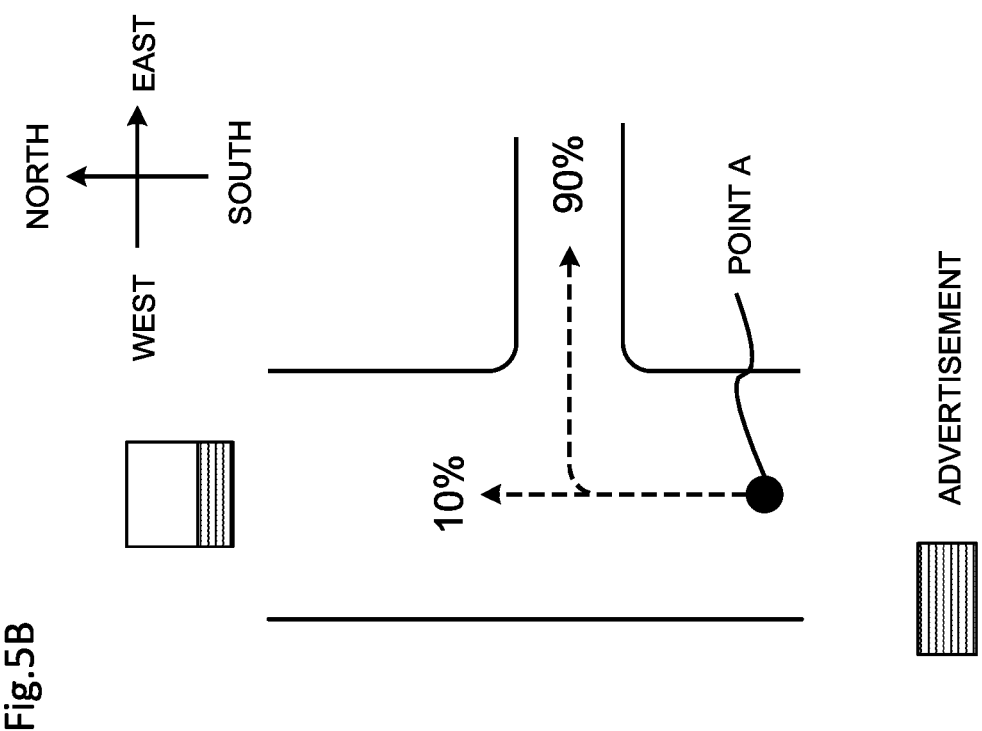
FIGS. 5A and 5B are diagrams showing examples of advertisement contact determination in consideration of a moving path of a device 10.
Figure 5A:
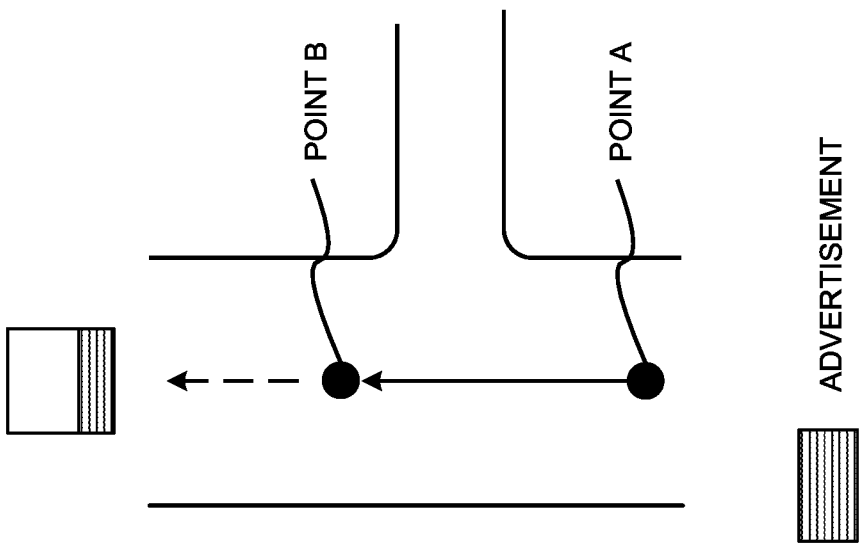

FIG. 5A and FIG. 5B are diagrams showing examples of the advertisement contact determination in consideration of a moving path of the device 10.

FIG. 5A corresponds to a case where the determination device 30 obtains a point A and a point B as position information of the device 10 around the shown advertisement. If, in terms of time, the time associated with the position information of the point A is before the time associated with the position information of the point B, the determination device 30 may decide that the device 10 has moved from the point A to the point B during a period between those times. The determination device 30 may decide that a user of the device 10 is directing to the direction from the point A to the point B during the period between those times.

The determination device 30 may decide that a user of the device 10 is directing to the direction from the point A to the point B during the period between those times. The determination device 30 may decide that the user of the device 10 has come into contact with the shown advertisement. If, in terms of time, the time associated with the position information of the point A is after the time associated with the position information of the point B, the determination device 30 may decide that the device 10 has moved from the point B to the point A and that the user of the device 10 has not come into contact with the shown advertisement.

If an advertisement at a certain point is included in a certain range in the traveling direction of a user of the device 10, the determination device 30 may determine that the user has come into contact with the advertisement. For example, if the position information of the device 10 is in vicinity of the certain point and if the direction of the user of the device 10 directs to the direction of the advertisement (such as a signage) at the certain point, it may be decided that the user has come into contact with the advertisement. Directing to a certain direction may mean directing to a direction including a displacement equal to a certain threshold (such as ±20 degrees) from the certain direction.

The certain range in the traveling direction may be interchanged with, for example, "sight" (hereinafter, simply called "sight"). Note that the determination device 30 may estimate a user's sight based on demographic data (such as age, gender, living place, family makeup, or occupation) of the user.

FIG. 5B corresponds to a case where the determination device 30 obtains only the point A as position information of the device 10 around the shown advertisement. If the frequency of obtaining position information of the device 10 is low (such as once in 15 minutes), it may be considered that the number of position information pieces obtained around the advertisement is low as described above.

The determination device 30 may estimate which direction the user of the device 10 at the position information of the point A will move to based on, for example, demographic data of the user. The example in FIG. 5B shows that, when the user of the device 10 corresponding to the position information of the point A is a 20-year-old male, the probability that he will move straight from the point A to the north is 10% and the probability that he will move from the point A to the east is 90%. In this case, if the user of the device 10 corresponding to the position information of the point A is a 20-year-old male, the determination device 30 may determine that he will come into contact with the shown advertisement at a probability of 10% for moving straight to the north.

If the frequency of obtaining position information of the device 10 is relatively high, the determination device 30 may perform the advertisement contact determination by using a moving path derived based on the position information as shown in FIG. 5A, and, if the frequency of obtaining position information of the device 10 is relatively low, may perform the advertisement contact determination by using a moving path estimated as shown in FIG. 5B.

According to the aforementioned embodiment, an OOH advertisement with which a user of the device 10 comes into contact while being away from home can be optimally determined.

<Advertisement Contact Determination within Car>

Whether an advertisement within a car has been viewed or not has been collected conventionally by using a measure such as a questionnaire survey. However, advertisement contact determination within a car by more convenient and easier method has been demanded.

Even an advertisement within a car that can be visually recognized when seats and aisles therein are not fully occupied may not be viewed easily or at all at some positions in some state of congestion within the car. Also, in some state of congestion, no actions other than viewing an advertisement can be performed, which may sometimes increase the effect of the advertisement. In consideration of that, the present inventors and so on have reached a highly precise advertisement contact determination method within a car.

The determination device 30 may determine an advertisement with which a user has come into contact within a car based on a time zone when the user has ridden on the car, a position of the user within the car, a direction of the user within the car and so on.

The determination device 30 may derive in advance a state of congestion by time zone for each line. The determination device 30 may acquire a state of congestion of a line based on a questionnaire survey to users of the line, measurement results by sensors installed in cars or stations, information obtained in the devices 10 carried by users of the line and so on. Here, the information obtained in the devices 10 may be, for example, a communication speed. The determination device 30 may decide that it is crowded during a time zone with a slow communication speed.

The state of congestion may be indicated by an index relating to a level of congestion (such as an occupancy rate) or may be indicated by a level of congestion (congestion division) specified based on the index. The level of congestion may also be called a congestion degree or a density and may be defined as, for example, "crowded" (such as an occupancy rate of 100% or higher) indicating a crowded state, "aisle less-crowded" (such as an occupancy rate of 30% to 70%) indicating a state that seats are filled but there is an empty space in the aisle, "seats and aisle less-crowded" (such as an occupancy rate lower than 30%) indicating a state that there are empty seats and an empty space in the aisle and so on.

FIG. 6 is a diagram showing an example of congestion states by time zone of lines. In this example, congestion degrees of a line X and a line Y from 4:00 to 25:00 are shown. For example, defining a congestion degree of 50 or more as "crowded" and a congestion degree of 30 or more as "aisle less-crowded", the line X is substantially "crowded" during time zones excluding early morning, noon and midnight. On the other hand, the line Y is "crowded" during a time from 7:00 to 10:00, during a time from 18:00 to 19:00 and during a time from 21:00 to 22:00.

Figure 7:
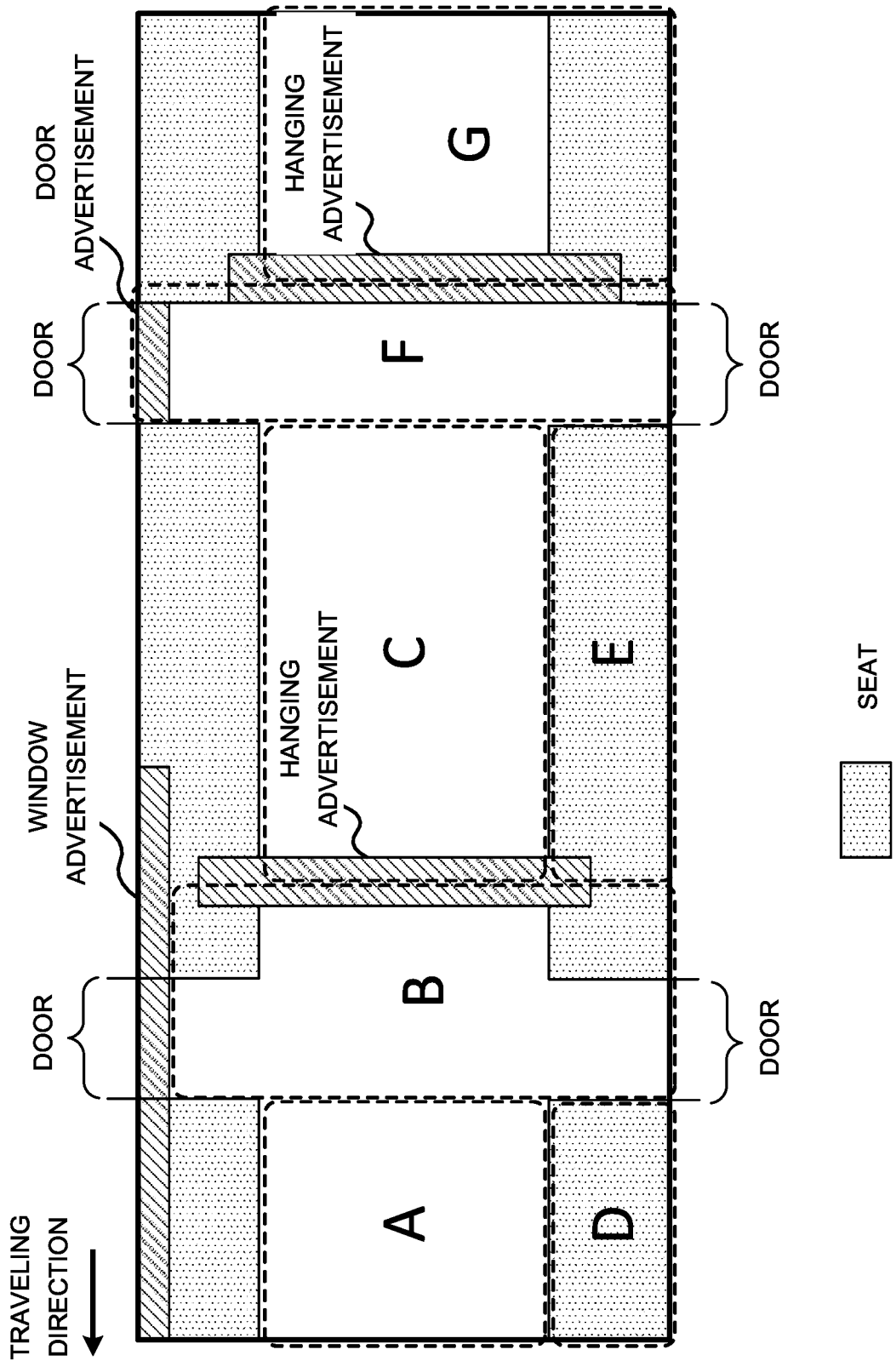
FIG. 7 is a diagram showing examples of divisions of user positions within a car and positions of advertisements provided in the car.

The determination device 30 may derive in advance a relationship between position of a user and a visually recognizable advertisement (medium) for each car of a line. The determination device 30 may decide how many advertisements a user can visually recognize based on a car of a line, a position of the user, the congestion degree and so on. FIG. 7 is a diagram showing examples of divisions of user positions within a car and positions of advertisements provided in the car. FIGS. 8A and 8B are diagrams showing examples of visually recognizable advertisements depending on user positions within a car.

In the example in FIG. 7, seven divisions (areas A to G) of user positions are indicated, and four advertisements (one window advertisement, two hanging advertisements and one door advertisement) are indicated. For simplicity, divisions of positions of users on the right side seats in the travelling direction are omitted.

FIGS. 8A and 8B show the numbers of advertisements that can be visually recognized by users corresponding to the divisions in the example in FIG. 7 during the "aisle less-crowded" time and the "crowded" time, respectively. The number "0" means that the advertisement is not visually recognizable. Note that, because it is assumed that contents of the two hanging advertisements are the same in this example, the number of advertisements is indicated as "1" even when both of the two hanging advertisements are visually recognizable.

It may be assumed that, during the "aisle less-crowded" time, advertisements in a certain range (advertisements in sight) are visually recognizable by a standing person. It may be assumed that although a standing person can visually recognize the window advertisement and hanging advertisement in a certain range (advertisements in sight) during the crowded time, the door advertisement is not visually recognizable because another person is standing in front of the advertisement.

It may be assumed that a person sitting on a seat can visually recognize advertisements in a certain range (advertisements in sight) during the "aisle less-crowded" time. It may be assumed that, although a person sitting on a seat can visually recognize hanging advertisements in a certain range (advertisements in sight) during the crowded time, the window advertisement and door advertisement on the opposite side in the traveling direction are not visually recognizable because another person is standing in front of those advertisements.

FIGS. 8A and 8B show that the window advertisement and hanging advertisement are visually recognizable in divisions A and B corresponding to a standing person. FIGS. 8A and 8B show that, although all advertisements are visually recognizable during the "aisle less-crowded" time in a division C corresponding to a standing person, the door advertisement is not visually recognizable in the division C during the "crowded" time. In a division G, both of a standing person and a person sitting on a seat cannot see the window advertisement.

Note that how positions within a car is divided and correspondences between congestion states and visibility in the present disclosure are not limited to the aforementioned examples. The embodiment of the present disclosure in which an advertisement is "visually recognizable/not visually recognizable" may include embodiments in which an advertisement is "recognizable/not recognizable", "noticeable/not noticeable" and so on. For example, the determination device 30 may decide how much a user has paid attention to an advertisement based on a car of a line, a position of the user, the congestion degree and so on.

The determination device 30 may decide that there is a high possibility that a user is certainly viewing an advertisement that is visually recognizable by the user if the congestion degree is relatively high and that the user is not viewing the advertisement well (that is, the user does not understand the content or does not recognize the target advertisement although the user thinks that he or she is viewing the advertisement, for example) if the congestion degree is relatively low. An index regarding whether a user is certainly viewing an advertisement or not may be called an attention degree, a viewing attitude, a viewing quality or the like, and the determination device 30 may decide the attention degree to an advertisement by a user within a car, an effect of the advertisement and so on based on a car of a line, a position of the user, the congestion degree or the like.

FIGS. 9A to 9C are diagrams showing an example of determination of an advertisement with which a user has come into contact in the car based on the time zone when the user has ridden (or been) on a car and the position of the user within the car. This example assumes the line Y in FIG. 6 and assumes that advertisements visually recognizable in accordance with the positions of users in a car of the line Y are as shown in FIGS. 8A and 8B. In the example, advertisement contacts during times zones from 9:00 to 12:00 on weekdays by four of users 1 to 4 are to be determined. Note that the time zones that the users have ridden may correspond to time zones when the users have ridden in a certain period of time (such as one month).

First, the determination device 30 obtains a time zone when each user has ridden on a car. The determination device 30 may decide the time zone when each user has ridden (been) on the car based on the advertisement contact areas. For example, the determination device 30 may determine that a user in an advertisement contact area on a moving path of a car as shown in FIG. 4A is in the car during a period of time when the user is staying in the advertisement contact area.

If a user having entered an advertisement contact area in one station as shown in FIG. 4B at a time A leaves an advertisement contact area in another station at a time B within a certain period of time (such as one day), the determination device 30 may determine that the user has been on a car of a train connecting these two stations during a period from the time A to the time B.

The determination device 30 obtains a position of a user having ridden on a car in each time zone. The determination device 30 may acquire a position of a user within a car (such as which part (such as front, center or back) of which car) based on a questionnaire to the user, a measurement result of a sensor installed in the car or a station, information obtained in the device 10 of the user or the like.

For example, a beacon installed in a car may transmit at least one of information on the car in which the beacon is installed, information on a coordinate within the car, information regarding a door nearby and so on to the device 10 in the vicinity or the determination device 30. The device 10 may transmit information (which may include a timestamp) received from the beacon to the determination device 30.

FIG. 9A shows time zones when users have ridden on a car and positions of the users within the car. FIG. 9A shows that a user 1 has been at a position in the division A during a time from 9:00 to 10:00, a position in the division B during a time from 10:00 to 11:00 and a position in the division C during a time from 11:00 to 12:00. FIG. 9A further shows that a user 2 has been at a position in the division A during the time from 10:00 to 11:00 and a position in the division F during the time from 11:00 to 12:00. FIG. 9A further shows that a user 3 has been at a position in the division D during a time from 9:00 to 10:00. FIG. 9A further shows that a user 4 has been at a position in the division G during a time from 10:00 to 11:00.

FIG. 9B shows congestion levels in time zones, which are derived from congestion degrees of the line Y in FIG. 6. The time from 9:00 to 10:00 corresponds to "crowded", and the time from 10:00 to 11:00 and the time from 11:00 to 12:00 correspond to "aisle less-crowded".

FIG. 9C shows determination results on the presence/absence of a contact with a window advertisement by a user additionally in consideration of FIGS. 8A, 8B, 9A and 9B. Because the window advertisement is visually recognizable during all of the time from 9:00 to 10:00, the time from 10:00 to 11:00 and the time from 11:00 to 12:00, the user 1 is determined as "having come into contact with the window advertisement". Because the window advertisement is visually recognizable during the time from 10:00 to 11:00, the user 2 is determined as "having come into contact with the window advertisement".

Because the window advertisement is not visually recognizable at D during the time from 9:00 to 10:00, the user 3 is determined as "not having come into contact with the window advertisement". Because the window advertisement is not visually recognizable at G, the user 4 is determined as "not having come into contact with the window advertisement".

Note that the determination device 30 may calculate a reach to each medium (such as a window advertisement or a hanging advertisement) for each line by using a proportion of people having come into contact with the medium to the whole surveyed users. A time zone may be considered in accordance with the medium.

The device 10 may transmit information regarding the direction of a user within a car to the determination device 30. The information may be acquired based on a sensor installed in the device 10, a camera mounted in the car or the like. The determination device 30 may estimate the direction within a car of a user of the device 10 based on the information and use it for determination of an advertisement contact.

For example, the number of visually recognizable advertisements shown in FIGS. 8A and 8B may be identified in consideration of not only the position of a user but also the direction of the user within a car.

According to the aforementioned embodiment, an advertisement with which a user of the device 10 has come into contact within a car can be determined with high precision.

<Internet Radio>

A user may listen to Internet radio through the device 10 while he or she is staying at home or is moving. The determination device 30 may receive a listening log of Internet radio from the device 10 or may determine at least one of a listening rate of Internet radio and an effect of an advertisement played in the Internet radio.

Here, Internet radio in the present disclosure may include an IP simul radio that delivers the same content as that of normal radio broadcasting using radio waves (which may also be called terrestrial radio) over the Internet and audio contents (such as read articles by a newspaper company and audio books). In other words, the Internet radio of the present disclosure may be replaced by an arbitrary audio content to be transmitted and received over the Internet (which may also include an element other than audio if the content includes audio).

[Bias Correction on Demographics]

The determination device 30 may determine at least one of the listening rate of terrestrial radio and an effect of an advertisement played in the terrestrial radio based on a listening log of Internet radio through the device 10.

Note that users of Internet radio may be considered to have a bias that they are younger than users of terrestrial radio. For that, the determination device 30 may perform random sampling from collected listening logs of Internet radio of a plurality of devices 10 such that the demographics (genders, ages, areas) of users of Internet radio have a composition ratio similar to that of the demographics of users of terrestrial radio.

The determination device 30 may create a listening log of terrestrial radio for a pseudo user based on the randomly sampled listening logs of the Internet radio. Thus, the bias above can be corrected, and a listening tendency of the radio can be estimated from the listening tendency of the Internet radio.

[While-Listening]

A user can perform a behavior for listening to radio including the Internet radio while doing something (which may also be called "while-listening"), which is one medium characteristic. The determination device 30 may analyze details of the "while-listening" by a user of the device 10 based on a listening log of Internet radio through the device 10. The determination device 30 may analyze and correct a difference between "while-listening" of Internet radio and "while-listening" of radio.

The determination device 30 may analyze details of "while-listening" by using a log of the apparatus 20 in addition to the position information and a listening log of the device 10. For example, the determination device 30 may determine that, as described above, "while-listening" using the apparatus 20 is being performed during a period when the device 10 is decided as existing in vicinity of the apparatus 20. As an example, in a case where the device 10 for listening to Internet radio is connected to the apparatus 20 by SmartDeviceLink, the determination device 30 may determine that a user of the device 10 is moving or is driving by using a vehicle.

The determination device 30 may perform classification or prediction by using position information of the device 10 (such as GPS position information) and a listening log (such as a listened program, a station, a listening time, a day of the week, an operating system or a used terminal) as an explanatory variable and using a type of "while-listening" as an objective variable.

A type of "while-listening" may include a specific type of action (which may be called "while-action" such as study or moving) performed simultaneously with listening or may be associated with some parameters relating to "while-action". For example, the parameters may include information (which may be called a "status") indicating that a user is staying still or moving while listening. The parameters may include information (which may be called a "place") indicating at which place the user is listening.

For example, when the status is "still", candidates such as "home", "office or school", "store (such as a cafe)" and the like may be assumed for the place. When the status is "moving", candidates "public transit system", "driving", "walking" and the like may be assumed for the place.

The determination device 30 may calculate an index such as a reach or a frequency of an advertisement in Internet radio or radio by identifying the "while-listening" above and performing correction on the samples after the aforementioned random sampling.

[Evaluation of Degree of Contribution to KPI for Each while-Listening]

For an advertisement, in order to evaluate attainment of a goal to be achieved by the advertisement, an index indicating an advertisement effect (such as a key performance indicator (KPI) or a key goal indicator (KGI) is used. Examples of the KPI include recognition, purchase intension, site visit, subscription, visit to real store, and real purchase. Although the index indicating an advertisement effect is a KPI in the following description, the index is not limited thereto.

In radio and Internet radio, a recency effect to customer guidance to a real store produced by listening while moving can be expected. For that, for each "while-listening" above, the effect for a KPI is preferably quantitatively measured. Hereinafter, "while-listening" and "while-action" can be interchangeable with each other.

The determination device 30 may calculate an achievement ratio for each KPI in consideration of the frequency and multiply the achievement ratio by the number of reached users of the advertisement to analyze how much the "while-listening" contributes (the degree of contribution) to the KPI. The achievement ratio for a KPI (KPI achievement ratio) may be a value acquired by dividing the achieved number of people to the KPI by the number of people who have come into contact with the advertisement. The degree of contribution to a KPI may be calculated by the KPI achievement ratio×the number of reaches.

For example, regarding "while-listening" with "still" as the status and "home" as the place, A % contribution and B % contribution may be calculated for "recognition" and "purchase intention", respectively, of KPIs.

The determination device 30 may control an effective advertisement placement in consideration of "while-listening" based on the degree of contribution to the KPIs for each "while-listening".

[Integration with Television Viewing and OOH Advertisement Contact]

The determination device 30 may verify a synergistic effect between an advertisement provided by the apparatus 20 and an OOH advertisement and an advertisement provided by Internet radio/radio by performing detailed analysis on "while-listening" of Internet radio in consideration of a log of the apparatus 20, a determination result of OOH advertisement contacts and so on. For example, the aforementioned place of "while-listening" may include at least one of latitude/longitude and a name of a building (or place name).

According to the aforementioned embodiment, because exposure in an advertisement slot, the degree of contribution to a KPI and so on can be efficiently derived for Internet radio, the effect of the advertisement can be adjusted for further improvement.

Note that Internet radio (or radio) of the present disclosure is interchangeable with another medium that can be viewed or listened while performing "while-action". For example, Internet radio may be interchanged with music or movie streaming.

<Others>

Based on a state (log) of the device 10, the determination device 30 may decide that a user is not watching the apparatus 20 or viewing an OOH advertisement. For example, during a time zone corresponding to a log indicating that the device 10 is being operated, it may be decided that a user of the device 10 is watching the device 10 and the user is not watching the apparatus 20 even when the power of the apparatus 20 is ON.

Furthermore, it may be decided that the user of the device 10 is watching the device 10 during the time zone corresponding to the log indicating that the device 10 is being operated and that, even though the user is at a position where the user can visually recognize an in-car advertisement, the user is not viewing the in-car advertisement.

In each of the embodiments described above, partial steps may be omitted. For example, even when the determination device 30 does not perform the determination on whether the device 10 exists in vicinity of the apparatus 20 in a certain period of time or not (step S102), the user OOH contact determination may be performed.

Having described the example where the determination device 30 performs determinations (such as OOH advertisement contact determination and in-car advertisement contact determination) on a user according to each of the aforementioned embodiments, the present disclosure is not limited thereto, but the determinations may be performed by other devices including the device 10, and the determination results may be transmitted to the determination device 30. For example, if the device 10 grasps information regarding an advertisement contact area, the device 10 may determine whether the device 10 has come into contact with an OOH advertisement or not based on position information acquired by the device 10 itself and may transmit information regarding the position and time of the contact with the OOH advertisement to the determination device 30.

Note that the determination device 30 may identify a viewing attitude (which may be called a attention degree or viewing quality as described above) to an advertisement of a user of the device 10 based on at least one of the speed of the device 10, the position of the device 10, the length of stay at a certain position of the device 10, the direction (such as front direction) of a user of the device 10, what is a transportation device (conveyance) of the user of the device 10, the congestion degree of the transportation device (conveyance) used by the user of the device 10 and so on.

Thus, whether the viewing attitude to the advertisement of the user who is using a certain transportation device is good or bad can be easily decided, and evaluation of the effect of the advertisement can be optimally performed.

(Apparatus Configuration)

FIG. 10 is a diagram showing an example of a functional configuration of a device according to the embodiment. As shown in the example, the device 10 has a control unit 110, a storage unit 120, a communication unit 130, an input unit 140 and an output unit 150. Note that functional blocks which are characteristic parts in the present embodiment are mainly shown in FIG. 10, and the device 10 may have other functional blocks required for other processes. Further, a configuration is also possible in which a part of the functional blocks are not included.

The control unit 110 performs control of the device 10. The control unit 110 can be configured with a controller, a control circuit or a control device that is described based on common recognition in the technical field of the present disclosure.

The storage unit 120 stores (holds) information used in the device 10. The storage unit 120 can be configured with a memory, a storage, a storage device or the like that is described based on common recognition in the technical field of the present disclosure, for example.

The communication unit 130 performs communication with other communication devices (the apparatus 20, the determination device 30 and the like) via a network. The communication unit 13 may output received various information to the control unit 110.

The communication unit 130 can be configured with a transmitter/receiver, a transmission/reception circuit or a transmission/reception device that is described based on common recognition in the technical field of the present disclosure. Note that the communication unit 130 may be configured with a transmission unit and a reception unit.

The input unit 140 accepts an input by an operation from a user. Further, the input unit 140 may be connected to certain equipment, a storage medium and the like to accept input of data. The input unit 140 may output an input result, for example, to the control unit 110.

The input unit 140 can be configured with an input device such as a keyboard, a mouse, buttons and the like, an input/output terminal, an input/output circuit or the like described based on common recognition in the technical field of the present disclosure. Further, the input unit 140 may be integrated with a display unit (for example, a touch panel).

The output unit 150 performs output of data, content and the like in a format perceptible to a user. For example, the output unit 150 may include the display unit to display an image, a sound output unit to output sound, and the like.

The display unit can be configured with a display device such as a display and a monitor that is described based on common recognition in the technical field of the present disclosure, for example. The sound output unit can be configured with an output device such as a speaker that is described based on common recognition in the technical field of the present disclosure.

The output unit 150 can include an arithmetic unit, an arithmetic circuit, an arithmetic device, a player, an image/video/sound processing circuit, an image/video/sound processing device, an amplifier and the like described based on common recognition in the technical field of the present disclosure, for example.

Note that the control unit 110 may manage records of position information of the device 10. The control unit 110 may control transmission to the determination device 30 by using the communication unit 130 of position information of the device 10, information for identifying that the device 10 exists in vicinity of the apparatus 20 and so on. The communication unit 130 may receive Internet radio and the like.

Each of the apparatus 20, the determination device 30 and the like may have a configuration similar to that in FIG. 10. One skilled in the art can appropriately replace and understand the description related to the device 10 in the description of FIG. 10.

Some units will be illustratively described below. Note that a reference numeral of a device corresponding to each functional block of FIG. 10 is shown by applying a first-digit numeral of a reference numeral indicating the device (for example, in the case of the apparatus 20, "2" at the first digit of "20") to the first-digit numeral in FIG. 10.

The control unit 210 in the apparatus 20 may perform control to obtain, record or collect a log corresponding to the apparatus 20 and transmit it to the determination device 30 by using the communication unit 230.

The communication unit 330 in the determination device 30 may obtain a log of a certain apparatus (the apparatus 20). The control unit 310 in the determination device 30 may determine whether a device (the device 10) exists in vicinity of the certain apparatus in a certain period of time or not and, if the device exists, associate the log of the certain apparatus in the certain period of time with the device.

The control unit 310 may determine a contact between a user of the device and an Out Of Home (OOH) advertisement in an out-of-home period when it is determined that the device does not exist in vicinity of the certain apparatus.

The control unit 310 may determine that the user of the device has come into contact with an advertisement in an advertisement contact area if position information of the device indicates a position within the advertisement contact area in the out-of-home period.

The control unit 310 may determine that a user having entered an advertisement contact area corresponding to a line in the position information of the device has come into contact with an advertisement provided within a moving object on the line during the out-of-home period.

The control unit 310 may determine an advertisement with which the user has come into contact within a moving object based on a time zone when the user has ridden on the moving object and a position of the user within the moving object.

The control unit 310 may determine whether an advertisement is visually recognizable at a position of a user within the moving object based on a congestion state within the moving object.

The control unit 310 may identify an action ("while-action") being performed while listening to Internet radio by using the device by a user of the device based on at least one of a log of the certain apparatus and a determination result of a contact with the OOH advertisement.

The control unit 310 may calculate a degree of contribution to an index (such as a KPI) indicating an advertisement effect of the action being performed while listening to the Internet radio.

(Hardware Configuration)

The block diagram used to describe the above embodiment shows blocks according to functions. Each of these functional blocks (components) is realized by an arbitrary combination of hardware and/or software. Further, means for realizing each functional block is not especially limited. In other words, each functional block may be realized by one device that is physically combined or may be realized by a plurality of devices by connecting two or more devices that are physically separated in a wired or wireless manner.

Figure 11:
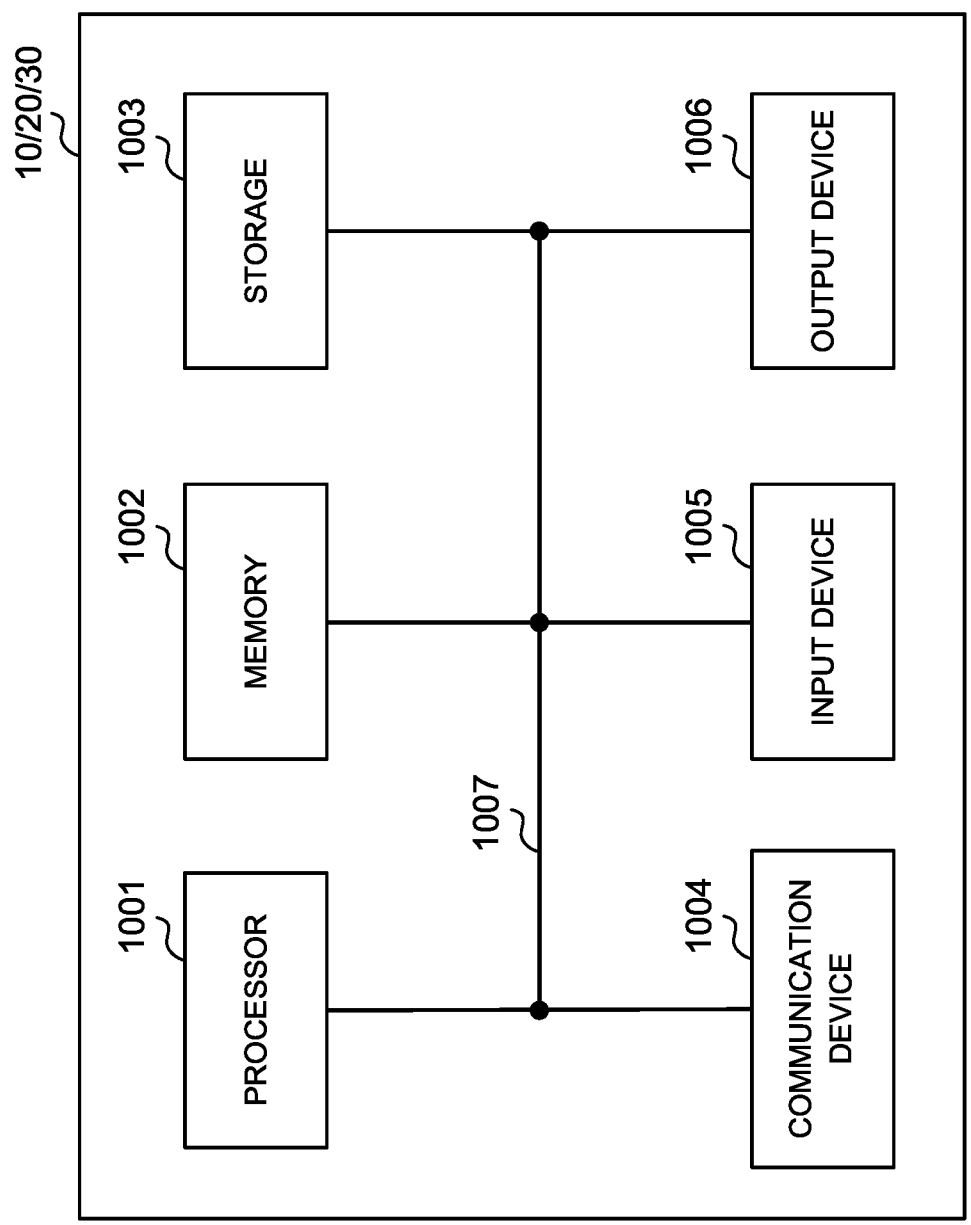
FIG. 11 is a diagram showing an example of a hardware configuration of, for example, a device according to one embodiment.

For example, a device or an apparatus (the determination device 30 or the like) in the embodiment of the present disclosure may function as a computer to perform the process of the advertisement contact determination method of the present disclosure. FIG. 11 is a diagram showing an example of a hardware configuration of the device and the like according to the embodiment. Physically, each of the device 10, the apparatus 20, the determination device 30 and the like described above may be configured as a computer apparatus including a processor 1001, a memory 1002, a storage 1003, a communication device 1004, an input device 1005, an output device 1006, a bus 1007 and the like.

Note that, in the present disclosure, the terms "apparatus", "circuit", "device", "unit", "server" and the like can be replaced with one another. The hardware configuration of the device 10, the apparatus 20, the determination device 30 and the like may be configured so as to include, for each of the devices shown in FIG. 11, one or more, or may be configured without including a part of the devices.

For example, though only one processor 1001 is shown, there may be a plurality of processors. Further, a process may be executed by one processor or may be executed by two or more processors at the same time, sequentially, or using other methods. Note that the processor 1001 may be implemented with one or more chips.

Each function of the devices and the apparatuses may be realized by causing certain software (a program) to be read on hardware such as the processor 1001 and the memory 1002, and thereby the processor 1001 performs an arithmetic operation to control communication by the communication device 1004, reading and/or writing of data on the memory 1002 and the storage 1003, and the like.

For example, the processor 1001 causes an operating system to operate and controls the whole computer. The processor 1001 may be configured with a central processing unit (CPU) that includes interfaces with peripheral devices, a control device, an arithmetic operation device, registers and the like. Note that each unit such as the control unit 110 described above may be realized by the processor 1001.

Further, the processor 1001 reads a program (a program code), a software module, data or the like from at least one of the storage 1003 and the communication device 1004 onto the memory 1002 and executes various kinds of processes according thereto. As the program, a program to cause a computer to execute at least a part of the operations described in the above embodiment is used. For example, the control unit 110 may be realized by a control program that is stored in the memory 1002 and operates on the processor 1001, and the other functional blocks may be similarly realized.

The memory 1002 is a computer-readable recording medium and may be configured, for example, with at least one of a read-only memory (ROM), an erasable programmable ROM (EPROM), an electrically EPROM (EEPROM), a random access memory (RAM) and other appropriate storage media. The memory 1002 may be called a register, a cache, a main memory (a main storage device) or the like. The memory 1002 can store a program (a program code), a software module or the like that can be executed to implement the method according to the embodiment.

The storage 1003 is a computer-readable recording medium and may be configured, for example, with at least one of a flexible disk, a floppy (registered trademark) disk, a magneto-optical disk (for example, a compact disc (a compact disc ROM (CD-ROM)) and the like), a digital versatile disc and a Blu-ray (registered trademark) disk), a removable disk, a hard disk drive, a smart card, a flash memory device (for example, a card, a stick and a key drive), a magnetic stripe, a database, a server and other appropriate storage media. The storage 1003 may be called an auxiliary storage device. Note that the storage unit 120 described above may be realized by the memory 1002 and/or the storage 1003.

The communication device 1004 is hardware (a transmission/reception device) for performing communication between computers via at least one of a wired network and a wireless network and is also referred to, for example, as a network device, a network controller, a network card, a communication module or the like. The communication device 1004 may include a SIM card. Note that the communication unit 130 described above may be realized by the communication device 1004.

The input device 1005 is an input device (for example, a keyboard, a mouse and the like) to accept an input from outside. The output device 1006 is an output device (for example, a display, a speaker and the like) to perform output to the outside. Note that the input device 1005 and the output device 1006 may be integrally configured (for example, a touch panel). Note that the input unit 140 and the output unit 150 described above may be realized by the input device 1005 and the output device 1006, respectively.

Further, the devices such as the processor 1001 and the memory 1002 are connected via a bus 1008 for communicating information. A bus 1007 may be configured with a single bus or may be configured with different buses among the devices.

Further, the device 10 and the like may include hardware such as a microprocessor, a digital signal processor (DSP), an application specific integrated circuit (ASIC), a programmable logic device (PLD) and a field programmable gate array (FPGA), and a part or all of each functional block may be realized by the hardware. For example, the processor 1001 may be at least one of these hardware modules.

(Modification)

Note that the terms described in the present disclosure and/or terms required to understand the present disclosure may be replaced with terms having the same or similar meanings.

The information, parameters and the like described in the present disclosure may be expressed using absolute values, expressed using relative values from certain values, or expressed with corresponding different information. Further, names used for parameters and the like in the present disclosure are not limiting in any respect.

The information, signals and the like described in the present disclosure may be those expressed using any of various different techniques. For example, data, an instruction, a command, information, a signal, a bit, a symbol, a chip and the like that can be mentioned through the whole description above may be indicated by a voltage, a current, an electromagnetic wave, a magnetic field or a magnetic particle, a light field or a photon, or an arbitrary combination thereof.

Information, signals and the like may be inputted/outputted via a plurality of network nodes. The inputted/outputted information, signals and the like may be stored in a particular place (for example, a memory) or managed using tables. For the inputted/outputted information, signals and the like, overwriting, update or addition can be performed. The outputted information, signals and the like may be deleted. The inputted information, signals and the like may be transmitted to other devices and apparatuses.

Further, notification of certain information (for example, a notification of "being X") is not limited to an explicit notification but may be suggestively performed (for example, by not performing notification of the certain information or by notifying different information).

Software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function and the like no matter whether it is called software, firmware, middleware, a microcode or a hardware description language or it is called by other names.

Further, software, instructions, information and the like may be transmitted/received via a transmission medium. For example, when software is transmitted from a website, a server or other remote sources using at least one of wired technology (a coaxial cable, an optical fiber cable, a twisted pair, a digital subscriber line (DSL) and the like) and wireless technology (infrared rays, microwaves and the like), at least one of the wired technology and the wireless technology is included in the definition of a transmission medium.

The terms "system" and "network" used in the present disclosure can be interchangeably used.

The each of the aspects/embodiment described in the present disclosure may be used alone, or the aspects/embodiment may be used in combination or used by being switched at the time of implementation. Further, order of the process procedures, sequences, flowcharts and the like of the aspects/embodiment described in the present disclosure may be changed unless there is a contradiction. For example, the method described in the present disclosure presents various step elements in illustrative order and is not limited to the presented particular order.

The expression "based on" used in the present disclosure does not mean "based on only" unless otherwise stated. In other words, the expression "based on" means both of "based on only" and "at least based on".

Reference to elements using names accompanied by "first", "second" and the like which are used in the present disclosure does not generally limit the quantities or order of the elements. These names can be used in the present disclosure as a convenient method for distinguishing between two or more elements. Therefore, reference to first and second elements does not mean that only the two elements can be adopted or that the first element must be prior to the second element in some form.

In the present disclosure, when "include", "including" and forms changed therefrom are used, these words are intended to be inclusive similarly to the term "comprising". Furthermore, the word "or" used in the present disclosure is intended not to be an exclusive OR.

In the present disclosure, for example, when an article is added by translation like "a", "an" and "the" in English, the present disclosure may include a case where nouns following these articles are in plural forms.

An invention according to the present disclosure has been described in detail above. It is apparent to one skilled in the art that the invention according to the present disclosure is not limited to the embodiment described in the present disclosure. The invention according to the present disclosure can be implemented as modified and changed aspects without departing from the spirit and scope of the invention determined based on description of Claims. Therefore, the description of the present disclosure is intended to give an illustrative explanation and does not give any restrictive meaning to the invention according to the present disclosure.

The present application is based on Japanese Patent Application No. 2019-025497 filed on Feb. 15, 2019, the content of which is hereby incorporated in its entirety.

The invention claimed is:

1. An advertisement contact determination system comprising:
   a communication unit configured to obtain position information of a device and a log of a certain apparatus; and
   a control unit configured to determine, based on at least one of following factors (a) or (b), that, the device exists in a vicinity of the certain apparatus in a certain period of time:
      the factor (a): determining that a distance between the certain apparatus and the device is equal to or shorter than a certain distance, on a basis of the position information of the device obtained from at least one of the certain apparatus and the device; and
      the factor (b): determining that Internet Protocol (IP) addresses of the certain apparatus and the device are same, based on an IP address obtained from at least one of the certain apparatus or the device, wherein
   the control unit, if the device exists in the vicinity of the certain apparatus in the certain period of time, associates the log of the certain apparatus in the certain period of time with the device, and
   the control unit, if the device does not exist in the vicinity of the certain apparatus in the certain period of time, determines that a user of the device has come into contact with an Out Of Home (OOH) advertisement if the OOH advertisement is included in a certain range in a traveling direction of the user based on the position information of the device.

2. The advertisement contact determination system according to claim 1, wherein the control unit determines that the user has come into contact with the OOH advertisement based on a traveling direction estimated based on demographic data on the user if a frequency of obtaining the position information of the device is relatively low.

3. The advertisement contact determination system according to claim 1, wherein the control unit determines the OOH advertisement with which the user has come into contact within a moving object on which the user has ridden based on a congestion state within the moving object and a position of the user within the moving object.

4. The advertisement contact determination system according to claim 3, wherein the control unit determines the OOH advertisement with which the user has come into contact within a moving object on which the user has ridden based on a congestion state within the moving object, a position of the user within the moving object, and a direction of the user within the moving object.

5. The advertisement contact determination system according to claim 3, wherein the control unit determines that the user is not viewing the OOH advertisement within the moving object at a time corresponding to a log indicating that the device is being operated.

6. The advertisement contact determination system according to claim 1, wherein the control unit identifies a viewing attitude to an advertisement of the user within a moving object on which the user has ridden based on a congestion state within the moving object.

7. The advertisement contact determination system according to claim 1, wherein
   the communication unit receives a listening log of an audio content transmitted and received by the device over the Internet, and
   the control unit determines, based on the listening log, that the user is using the certain apparatus while listening to the audio content by using the device in a period of time when the device exists in the vicinity of the certain apparatus.

8. An advertisement contact determination device comprising:
   a communication unit configured to obtain position information of a device and a log of a certain apparatus; and
   a control unit configured to determine, based on at least one of following factors (a) or (b), that the device exists in a vicinity of the certain apparatus in a certain period of time:
      the factor (a): determining that a distance between the certain apparatus and the device is equal to or shorter than a certain distance, on a basis of the position information of the device obtained from at least one of the certain apparatus and the device; and
      the factor (b): determining that Internet Protocol (IP) addresses of the certain apparatus and the device are a same, based on an IP address obtained from at least one of the certain apparatus and the device, wherein
   the control unit, if the device exists in the vicinity of the certain apparatus in the certain period of time, associates the log of the certain apparatus in the certain period of time with the device, and
   the control unit, if the device does not exist in the vicinity of the certain apparatus in the certain period of time, determines that a user of the device has come into contact with an Out Of Home (OOH) advertisement if the OOH advertisement is included in a certain range in a traveling direction of the user based on the position information of the device.

9. A non-transitory computer readable medium storing a program for causing a computer to perform:
   obtaining position information of a device and a log of a certain apparatus;
   determining, based on at least one of following factors (a) or (b), that the device exists in vicinity of the certain apparatus in a certain period of time:
      the factor (a): determining that a distance between the certain apparatus and the device is equal to or shorter than a certain distance, on a basis of the position information of the device obtained from at least one of the certain apparatus and the device; and
      the factor (b): determining that Internet Protocol (IP) addresses of the certain apparatus and the device are a same, based on an IP address obtained from at least one of the certain apparatus and the device;
   if the device exists in the vicinity of the certain apparatus in the certain period of time, associating the log of the certain apparatus in the certain period of time with the device; and if the device does not exist in the vicinity of the certain apparatus in the certain period of time, determining that a user of the device has come into contact with an Out Of Home (OOH) advertisement if the OOH advertisement is included in a certain range in a traveling direction of the user based on the position information of the device.

* * * * *